(12) United States Patent
Guo

(10) Patent No.: US 8,428,226 B2
(45) Date of Patent: *Apr. 23, 2013

(54) METHOD OF CALL TRACE ON MEDIA GATEWAY OF NEXT GENERATION NETWORK

(75) Inventor: Dong Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/045,767

(22) Filed: Mar. 11, 2011

(65) Prior Publication Data

US 2011/0176538 A1    Jul. 21, 2011

Related U.S. Application Data

(63) Continuation of application No. 11/497,626, filed on Aug. 2, 2006, now Pat. No. 7,961,628, which is a continuation of application No. PCT/CN2005/001224, filed on Aug. 10, 2005.

(30) Foreign Application Priority Data

Aug. 11, 2004    (CN) .......................... 2004 1 0059166

(51) Int. Cl.
*H04M 3/22*    (2006.01)
*H04J 1/16*    (2006.01)
*H04J 3/14*    (2006.01)
*H04L 12/56*    (2006.01)
*H04L 12/66*    (2006.01)

(52) U.S. Cl.
USPC ........ 379/32.05; 370/241; 370/242; 370/252; 370/352; 370/389; 370/247

(58) Field of Classification Search ............... 379/32.01, 379/32.02, 32.05, 247; 370/389, 241–253
See application file for complete search history.

(56) References Cited

U.S. PATENT DOCUMENTS 7,206,385 B2   4/2007   Ethier et al.
7,277,702 B2   10/2007   Ropolyi et al.
(Continued)

FOREIGN PATENT DOCUMENTS

CN    1494349 A    5/2004
CN    1497903 A    5/2004
(Continued)

OTHER PUBLICATIONS

1st Information Disclosure Statement in corresponding U.S. Appl. No. 11/497,626 (Oct. 30, 2007).
(Continued)

*Primary Examiner* — Harry Hong
(74) *Attorney, Agent, or Firm* — Brinks Hofer Gilson & Lione

(57) ABSTRACT

The present invention discloses a method of call trace on a next generation network (NGN) media gateway (MG). According to the present invention, a softswitch device adds an extended trace indication to an H.248 message related to the call to be traced; the MG determines whether the received H.248 message needs to be traced according to the extended trace indication; and if the H.248 message needs to be traced, trace the call to which the transaction in the H.248 message belongs. By the method, the MG can trace the entire calling process of a call.

4 Claims, 4 Drawing Sheets

U.S. PATENT DOCUMENTS

| | | | |
|---|---|---|---|
| 7,961,628 B2 * | 6/2011 | Guo | 370/241 |
| 2004/0062271 A1 | 4/2004 | Oliver et al. | |

FOREIGN PATENT DOCUMENTS

| | | |
|---|---|---|
| GB | 2400521 A | 10/2004 |
| WO | WO 02/082729 A1 | 10/2002 |
| WO | WO 03/024052 A1 | 3/2003 |

OTHER PUBLICATIONS $2^{nd}$ Information Disclosure Statement in corresponding U.S. Appl. No. 11/497,626 (Mar. 19, 2010).

$3^{rd}$ Information Disclosure Statement in corresponding U.S. Appl. No. 11/497,626 (Feb. 28, 2011).

$1^{st}$ Office Action in corresponding U.S. Appl. No. 11/497,626 (Mar. 11, 2010).

$2^{nd}$ Office Action in corresponding U.S. Appl. No. 11/497,626 (Jul. 21, 2010).

Corresponding U.S. Appl. No. 11/497,626, filed Jan. 5, 2012.

Written Opinion of the International Searching Authority in corresponding PCT Application No. PCT/CN2005/001224 (Oct. 20, 2005).

International Search Report in corresponding PCT Application No. PCT/CN2005/001224 (Oct. 20, 2005).

1st Office Action in corresponding Chinese Application No. 2004100591667 (Sep. 12, 2008).

1st Office Action in corresponding European Application No. 05772977.4 (Dec. 17, 2007).

2nd Office Action in corresponding European Application No. 05772977.4 (Jul. 23, 2008).

"3GPP TS 32.108—$3^{rd}$ Generation Partnership Project; Technical Specification Group Services and System Aspects; Subscriber and Equipment Trace (Release 5)," Feb. 2002, Version 0.1.0, $3^{rd}$ Generation Partnership Project, Valbonne, France.

"3GPP TS 32.421—$3^{rd}$ Generation Partnership Project; Technical Specification Group Services and System Aspects; Telecommunication management; Subscriber and equipment trace: Trace concepts and requirements (Release 6)," Mar. 2004, Version 6.3.0, $3^{rd}$ Generation Partnership Project, Valbonne, France.

Groves et al., "The Megaco/H.248 Gateway Control Protocol, Version 2," Apr. 2003, Internet Draft, the Internet Society, Reston, Virginia.

"H.248.1—Gateway control protocol: Version 1," Series H: Audiovisual and Multimedia Systems, Infrastructure of audiovisual services—Communication procedures, Mar. 2002, International Telecommunication Union, Geneva, Switzerland.

* cited by examiner

METHOD OF CALL TRACE ON MEDIA GATEWAY OF NEXT GENERATION NETWORK

CROSS-REFERENCE TO RELATED APPLICATIONS

This application is a continuation of U.S. patent application Ser. No. 11/497,626, filed on Aug. 2, 2006, which is a continuation of International Patent Application No. PCT/CN2005/001224, filed on Aug. 10, 2005, which claims priority to Chinese Patent Application No. 200410059166.7, filed on Aug. 11, 2004, all of which are hereby incorporated by reference in their entireties.

FIELD OF THE TECHNOLOGY

The present invention relates to next generation network (NGN) technology, and more particularly, to the technique for tracing a call process on a media gateway (MG) in NGN.

BACKGROUND OF THE INVENTION

Conventional communication networks for transmitting voice signals are usually based on Public Switched Telephone Network (PSTN) using a Time Division Multiplexing (TDM) technique. This kind of communication network gives priority to circuit switching, and voice services are transmitted and controlled by switches. The structure of a switch in a conventional TDM-based circuit switching network is shown in FIG. 1, wherein Signaling System 7 (SS7) is widely used in call controlling.

Along with a fast development of data services, conventional circuit switching networks bring much inconvenience to data service users, such as a high communication cost, a low net surfing speed, a long waiting time, a poor transmitting quality, and difficulties of implementing new services. On the other hand, along with the development of communication techniques, there is more and more possibility that one data network is the bearer of all services. It is in such a situation that the NGN is being put forward and has seen fast developed in recent years. The NGN has gradually changed the conventional PSTN circuit switching based network to a packet switching based network. This kind of packet switching based network can carry all kinds of services of the previous PSTN network, and at the same time, offload a great deal of data transmission to an Asynchronous Transfer Mode (ATM)/Internet Protocol (IP) network to release the burden of the PSTN. Moreover, based on the new properties of ATM/IP, many new services are provided, the functions of many old services are enhanced as well. In this sense, the NGN is an outcome of combining the TDM based PSTN voice network and the ATM/IP based packet network, which make the NGN possible to transmit voice, video, data and other integrated services in one new network. Moreover, the NGN adopts a softswitch technique in which service control is separated from media service bearers, which greatly enhances the processing capability of network equipments so that more voice services can be processed and the network can be the bearer of more kinds of services.

International Telecommunication Union-Telecommunication Standardization Sector (ITU-T) gave the following definitions of the NGN in February, 2004: the NGN is a packet network, which provides various services including telecommunication services, and can implement a separation of service functions from bottom-layer transmitting techniques by means of various bandwidths and transmitting techniques with the capability of Quality of Service (QoS); the NGN allows the users to freely access networks of different service providers, and supports a universal mobility, which brings consistency and unity in use of the services by the users.

A physical model of the NGN which adopts the softswitch technique is shown in FIG. 2. The softswitch in FIG. 2 controls MGs through a control protocol such as H.248/Media Gateway Control Protocol (MGCP). The SS7 only runs on the softswitch, and the H.323/Bearer Independent Call Control (BICC)/Session Initiation Protocol (SIP) and other protocols also run on the softswitch while each MG only performs resource operations.

According to the H.248 protocol, the media resource operations on the MG are performed by taking a termination as an operating unit, and termination operations are mainly performed in a context.

The message transmission mechanism of the H.248 protocol is shown in FIG. 3. Those skilled in the art would know that the basic operation unit of an H.248 protocol message is a transaction, which includes several operations to the context and the terminations. A transaction is uniquely identified by a transaction ID (a long word of 32 bits). A combination of several transactions of the softswitch will comprise all the H.248 commands of an entire calling process.

In the MG operations based on H.248 messages, a process of adding terminations T1 and T2 and deleting T2 in a context C1 is shown in FIG. 4. In FIG. 4, the words shown above each arrow illustrates the H.248 message used in each step while the words shown below each arrow gives an explanation of the corresponding H.248 message used in this step.

Detailed description of the H.248 protocol can be found in "Megaco Protocol Version 1.0 (RFC3015)" or ITU-T H.248 Specification.

In the above process, once a fault, such as a call setup failure, occurs, the MG must trace the entire process of the call, and output the interacted H.248 messages and the internal resource operations so as to locate and solve the fault. However, since the number of calls and resource operations implemented in an MG is huge, and the timing of these calls and resource operations is interleaved, if information of all the interacted H.248 messages and internal resource operations are output, the signaling interaction of the entire process of each call cannot be distinguished. Therefore, the filters have to be set so that only the signaling interaction of H.248 messages and internal resource operations associated with the call being traced are output.

In the conventional art, in order to trace a call on an NGN MG, two technical schemes are often used, wherein both the schemes involve creating a trace task and setting tracing conditions in the MG manually. The implementation of the two technical schemes is as follows:

Technical scheme 1: manually set up a trace task in the MG to trace a designated context; after the reception of an H.248 message by the MG, analyze the context, and determine whether the call that the message belongs to needs to be traced; if the call needs to be traced, output the H.248 messages received and sent, and output the internal operation process of the MG associated to the context for use in analyzing the internal processing of the MG.

Technical scheme 2: manually set up a trace task in the MG to trace a designated termination; after the reception of an H.248 message by the MG, analyze the termination in the message, and determine whether the associated call needs to be traced, if the call needs to be traced, output the H.248 messages received and sent and output the internal operation process of the MG associated to the termination for use in analyzing the internal processing of the MG.

In actual applications, both of the two technical schemes have such problems as that the processes of some calls are difficult to trace, the defined tracing conditions are hard to detect and a trace is difficult to implement when there are too many associated contexts or terminations in one call and all the information of which should be output.

SUMMARY OF THE INVENTION

In view of the above, the present invention provides a method for tracing a call by a next generation network (NGN) media gateway (MG), by which the MG is capable of tracing the entire process of any call completely.

The method of tracing a call by an NGN MG in accordance with this invention includes the following steps:

a softswitch device adds an extended trace indication in the H.248 message relating to the call that needs to be traced; and the MG determines, according to the extended trace indication, whether the call to which the transaction in the received H.248 message belongs needs to be traced; if yes, trace the call to which the transaction in the H.248 message belongs.

It can be seen by comparison that the differences between the present invention and the conventional art are, according to the present invention, a trace ID is set in the H.248 message by the softswitch, contents which needs to be traced and output are designated, and the message with a trace ID will be traced by the MG.

The advantages of the current invention is, since a trace ID is set by the softswitch, via which the tracing by the MG is controlled, the shortcomings brought by tracing via a designated context or termination by the MG is overcome, and as a result, a plurality of calls can be traced at the same time, and the tracing information can be outputted respectively and distinctively. The technical scheme of the present invention is easy to implement. In addition, the H.248 messages and the traced internal processing are more integrated and clearer. Moreover, according to the present invention, it is possible to output all the signaling interaction of H.248 and the steps of internal resource operations of the call could be traced, which makes fault analyzing and fault locating convenient.

DETAILED DESCRIPTION OF THE INVENTION

Figure 1:
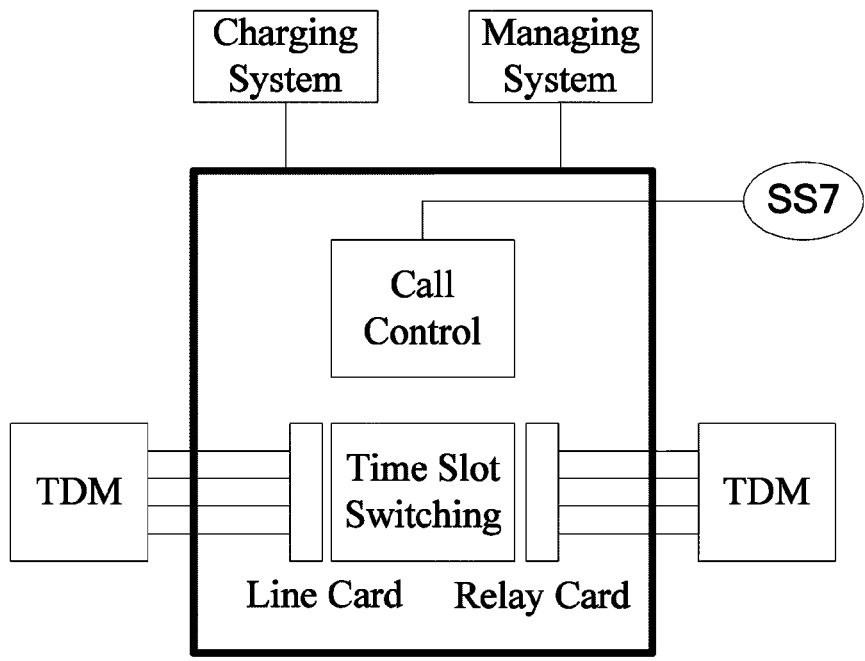
FIG. 1 is a schematic diagram of the structure of a switch in a conventional TDM based circuit switching network.
Figure 2:
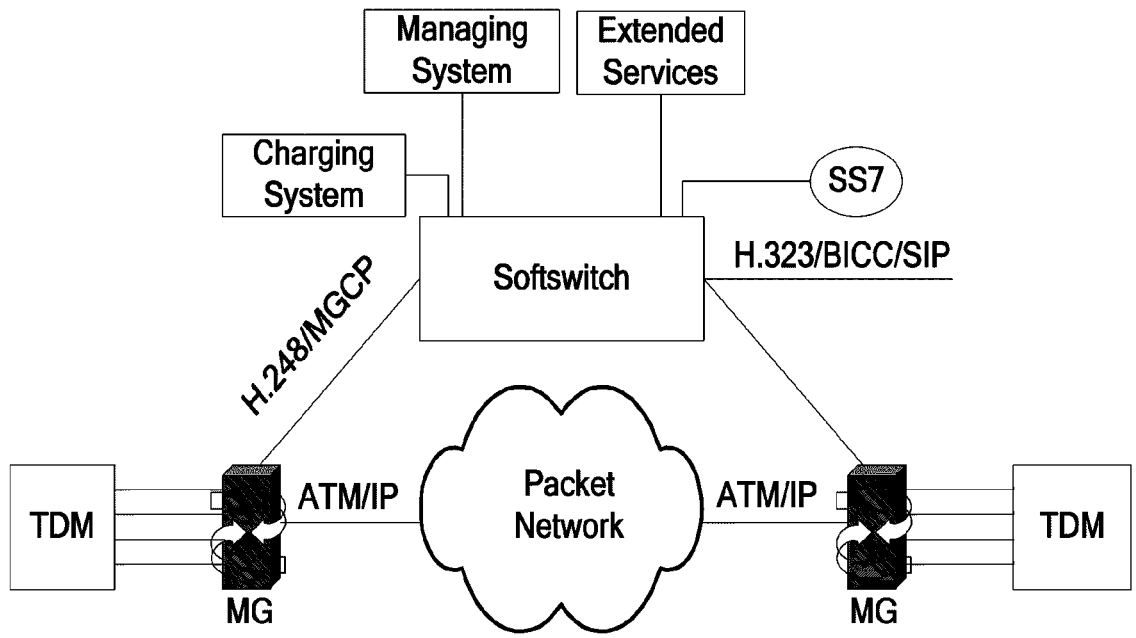
FIG. 2 is a schematic diagram of a physical model of the NGN adopting the softswitch technique.

As mentioned above, both of the two technical schemes in the prior art have problems such as that the processes of some calls are difficult to trace, the defined tracing conditions are hard to detect and a trace is difficult to implement when there are too many associated contexts or terminations in one call and all the information of which should be outputted.

The reasons for the above problems are as follows: in terms of technical scheme 1, first, for those call messages without an express designation of context, e.g. the Add.Req ($, T1) message used when the softswitch instructs the MG to select a context by itself, if tracing of the context is needed in this case, the message must be buffered by the MG, until a context is allocated, and then the tracing output can be obtained after a context matching, which is very difficult to implement.

Second, it is very difficult for users to confirm the allocation of contexts in the MG, if an context designated by the user has been already allocated, the previous messages and operations are unable to be traced (except that all the history messages and operations are buffered, which is unfeasible in practice), and if the context designated by the user can not be allocated until after a long time, there will be a waste of waiting time, which makes it difficult to designate a context.

Third, in practical applications, the processes of some calls are very complicated with many contexts associated, and tracing only one context can not give a complete reflection of the processing in the MG. Since the context associations are determined by the softswitch, the MG is unable to forecast the tracing relationship and unable to pre-designate each of the contexts manually. If the context associations are implemented by software in the MG, the processing will be made very complicated and the call tracing will be made difficult to implement.

Due to the same reason, technical scheme 2 has the same problems as messages without the express information about a designated termination are difficult to trace, designated terminations are difficult to choose, and termination associations are difficult to trace.

In order to solve the above problem, the present invention provides a method for tracing a call by an NGN MG. And detailed descriptions of the present invention will be given hereinafter with reference to accompanying drawings and preferred embodiments.

First, the basic principle of the invention will be described.

Since it is the softswitch that handles specific signaling, it is easy for the softswitch to determine the transactions that are associated with a certain call. If the tracing of the entire process of the call needs to be set up, the call can be traced just by indicating the associated transactions to be traced in the H.248 message sent from the softswitch to the MG, and at the same time, the MG can output the calling process being traced and the internal operating processes of the MG in the H.248 messages received and sent. The outputted information will show the entire handling process of a call in the MG.

Based on the above, the softswitch can instruct the MG to trace a call through an extended H.248 message communicated between the softswitch and the MG, and the MG outputs the communicated H.248 message and the internal resource operations of the entire handling process of the call being traced so that the complete call tracing by an MG of the NGN can be realized.

In order to realize the above idea, the transaction head of the H.248 message is extended according to the present invention to indicate to the MG by an on-off indicator that the call to which the transaction belongs needs to be traced. In this way, the MG can determine whether to trace the related call at the initial stage of analyzing the H.248 message, which greatly improves the efficiency. If no such an on-off tracing indicator is set, the MG needs to analyze to a deeper layer of the H.248 message to determine whether to trace the call, which would reduce the efficiency of tracing. At the same time, an H.248 call tracing extended package is defined to support the tracing of a plurality of calls simultaneously, and the package carries some context and control information which is necessary for displaying the traced information. The package can be defined in a termination state descriptor.

Figure 3:
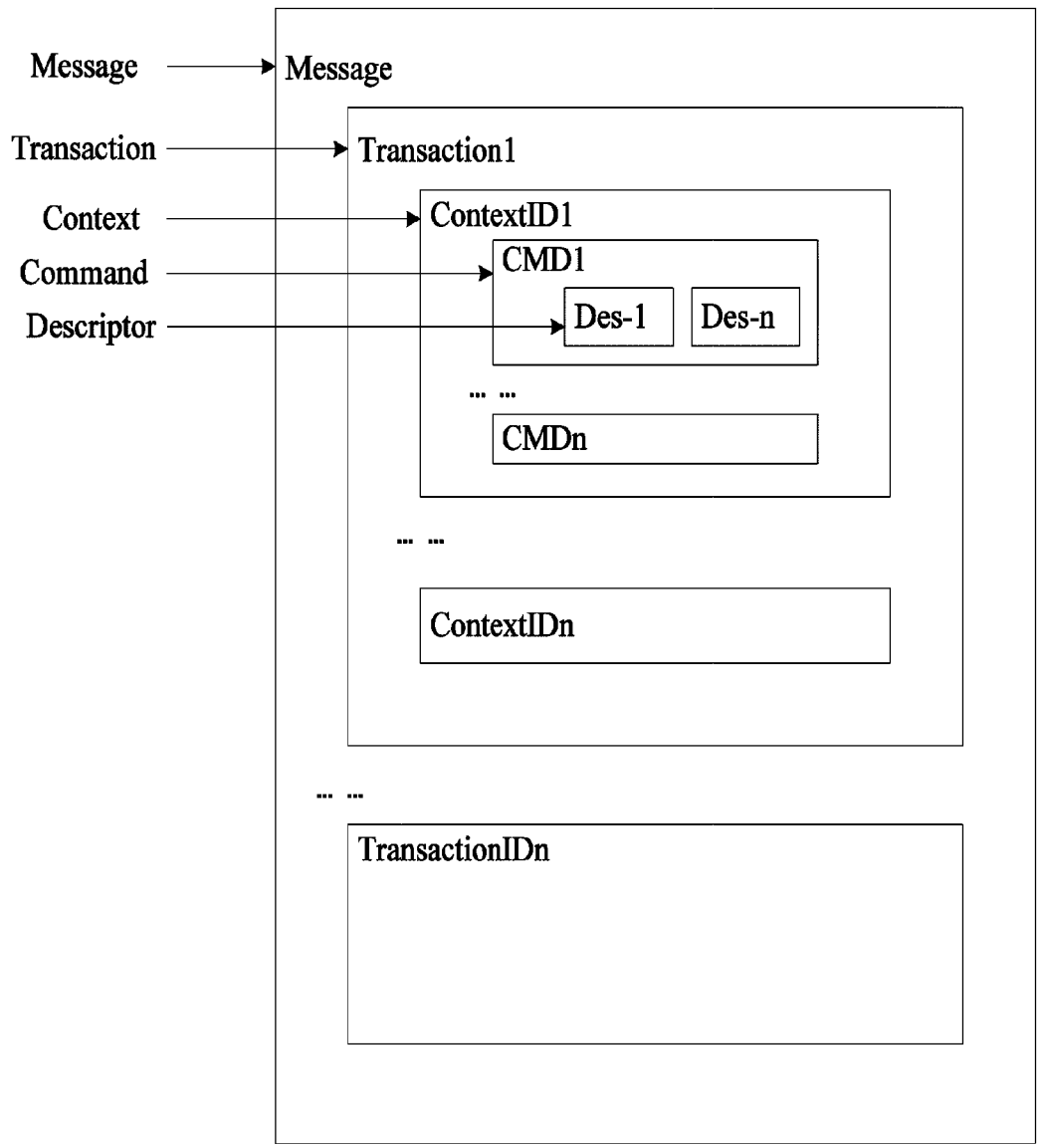
FIG. 3 is a schematic diagram of the message mechanism in the H.248 protocol.
Figure 4:
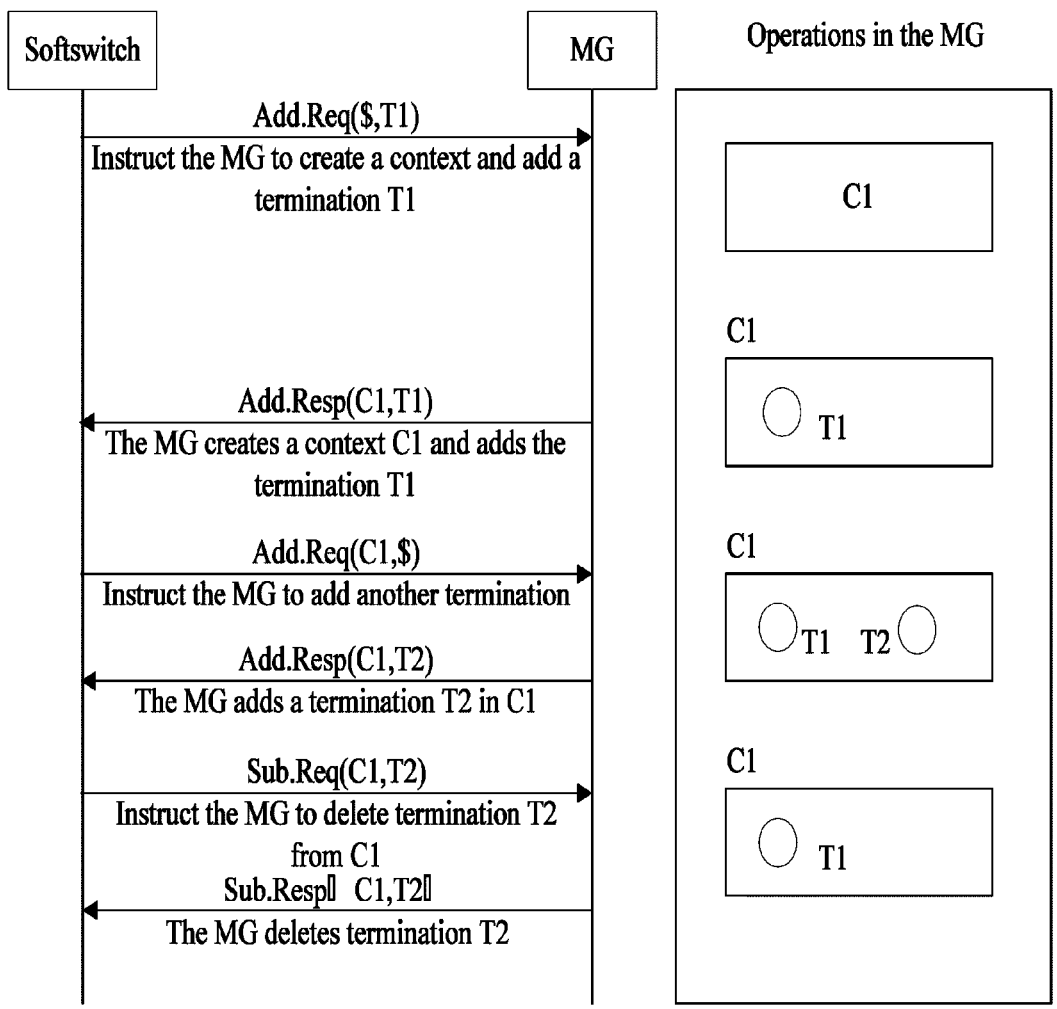
FIG. 4 is a schematic diagram illustrating the process of adding terminations T1 and T2 and the process of deleting termination T2 in the context C1 through the H.248 messages and operations in the MG.

According to the present invention, the MG can clearly output all of the calling information associating with the call being traced from the H.248 messages received and sent and output the related internal operations of the MG. Refer to FIG. 3 for a better understanding of the basic principle of the present invention as well as such concepts as message, transaction, context, command and descriptor of the H.248 protocol and the relations there between. It should be noted that, although an H.248 message can carry a plurality of transactions according to the H.248 protocol, most service providers, for convenience and high efficiency in implementation, carry only one transaction in one massage and one transaction conducts operations on the related contexts of only one call. In this case, the traced call information is the H.248 message itself.

If the above situation does not come into existence, e.g. there is a plurality of transactions carried in one H.248 message, the on-off tracing indicator set on the transaction head is needed in order to trace the transactions that needs to be traced. If there is a plurality of contexts of different calls carried in one transaction, such different calls should have a logical or restricting relation between themselves according to the definition of transaction in the H.248 protocol. Therefore, it will be meaningful to output the information of the whole transaction to analyze the processing of a call concerned by users.

A detailed description of a preferred embodiment of the present invention will be given hereinafter for a better understanding of the scheme of the invention.

According to the invention, the softswitch needs to extend the H.248 message to be sent to the MG in order to realize call tracing by the NGN MG.

First, in the H.248 message, an on-off tracing indicator is carried via the extended transaction head to indicate which transaction needs to be traced. According to a preferred embodiment of the present invention, the on-off tracing indicator is defined in the transaction ID. If the highest bit of transaction ID of the message sent to the MG by the softswitch is set to be 1, it is indicated that the transaction needs to be traced while the transaction need not be traced if the bit mentioned above is set to 0, wherein 0 is the default value of the on-off tracing indicator.

Secondly, a call tracing extended package is defined in the H.248 message, and the package carries identities for use in tracing multiple calls simultaneously, and the package also carries the content information and other control information that is necessary for displaying the output of traced information. Each termination relating to the call that needs to be traced carries the associated contents of this call tracing extended package in the appropriate commands of the H.248 message when it is allowed by the protocol to carry the package. The case that no extended package is allowed to be carried will be explained after description of the embodiment. In a preferred embodiment of this invention, the call tracing extended package is defined in the termination state descriptor, and the main properties of this call tracing extended package can be defined as follows:

Call Trace Package
1 Overall Description
Package Name: Call trace
Package ID: trace (temporarily defined to be 0x00A0) [Editor's note: this needs to be registered with IANA]
Description: this package allows call trace function in MG to be realized useful and convenient.
Version: 1
Extends: none
2 Properties
Property Name: Trace ID
Property ID: trid (0x0001)
Description: this value is a trace ID, which is used on the gateway to start simultaneously traces by multiple users. The call information of the same trace ID will be outputted to one trace window to observe the call processing simultaneously conducted by multiple users.
Type: Integer
Possible values: 0 to 0xFFFFFFFE
Defined in: Termination State
Characteristics: Read/Write
Property Name: User information
Property ID: usrinfo (0x0002)
Description: this value is the related user information, which is the additional information that is needed for displaying the traced information in the trace window, e.g. the telephone number. At the termination of the calling side, the calling telephone information is carried, and at the termination of the called side, the called telephone information is carried. According this information, the user information relating to the call information can be easily understood.
Type: List of String
Defined in: Termination State
Characteristics: Read/Write
Property Name: Trace depth
Property ID: trd (0x0003)
Description: this value is an indication of the trace depth, and the larger the value is, the stronger the trace function is. For example, 1 indicates a common grade of trace, wherein the output information only includes the call information in the H.248 message needed to be traced and the MG internal operations; 2 indicates that a tracing item is added on the basis of 1, for example, tracing the in-band negotiation signaling associated with the call (e.g. if fax or Modem negotiation has been performed, in-band negotiation signaling on the voice path of the user could be traced).
Type: Integer
Possible values: 1 to 10
Defined in: Termination State
Characteristics: Read/Write Those skilled in the art could understand that, after the H.248 message is extended according to the method mentioned above, the MG can determine whether to trace the call information of the transaction according to the on-off tracing indication in the transaction head, and output the tracing results of different calls, respectively, according to the call tracing extended package carried by the H.248 message so that all the call information and internal operations of the gateway during the designated call process can be traced.

Figure 5:
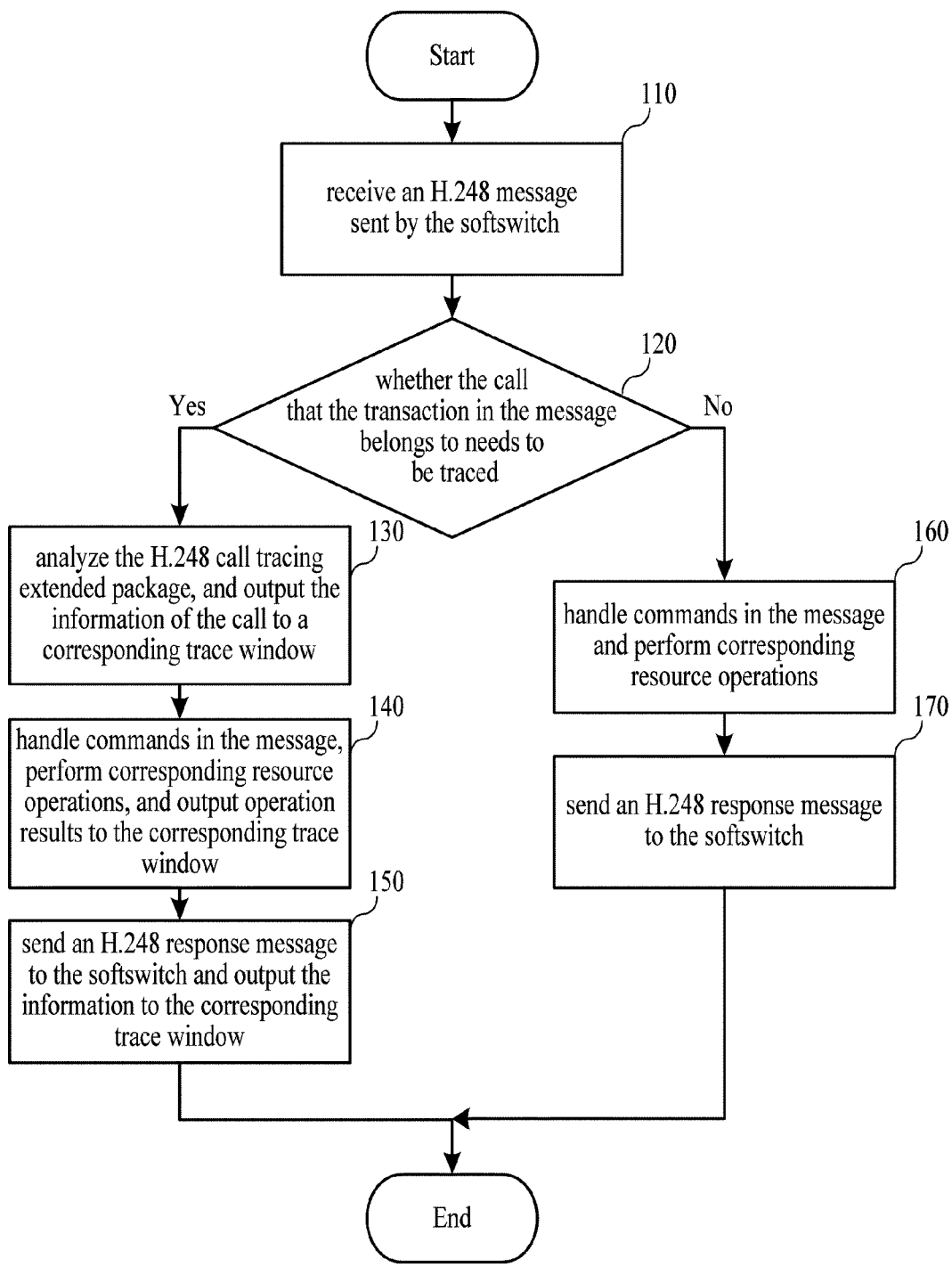
FIG. 5 is a flowchart of tracing a call by an NGN MG according to a preferred embodiment of the present invention.

The flowchart of a call trace performed by the NGN MG in a preferred embodiment of the present invention is shown in FIG. 5.

Step 110: the MG receives an H.248 message sent by the softswitch.

It should be noted that the H.248 message received in this step has extended the current H.248 protocol, and the method of extending the current H.248 protocol is the same as described above.

Step 120: the MG analyzes the message, and determines whether the call that the transaction in the message belongs to needs to be traced, if the call needs to be traced, proceed to step 130, otherwise, proceed to step 160.

In this step, whether the call needs to be traced is determined according to the on-off tracing indicator carried in the transaction head.

Step 130: the MG analyzes the H.248 call tracing extended package, and outputs the information in the received message about the call being traced to a corresponding trace window according to the trace ID.

It should be noted that the call tracing extended package is inserted to a corresponding position in the H.248 message by the softswitch according to the need of the call that needs to be traced.

Step 140: the MG processes the commands in the message, performs corresponding resource operations, and then outputs the operation results to the corresponding trace window according to the trace ID, wherein the information contents that need to be outputted are defined by the call tracing extended package.

Step 150: the MG sends an H.248 response message to the softswitch and outputs the information of the call being traced to the corresponding trace window according to the trace ID. It should be noted that the H.248 response message used in this step is completely the same as the H.248 response message in the current protocol. By now, the processing of the message that needs to be traced has been completed and the procedure of message processing ends.

Step 160: the MG processes the commands in the message and performs corresponding resource operations.

Step 170: the MG sends an H.248 response message to the softswitch.

It should be noted that processing operations in step 160 and step 170 are the processing of the messages that need not be traced, which are completely the same as those in the prior art. After step 170, processing of the messages that need not be traced is completed and the procedure of message processing ends.

Those skilled in the art could understand that the Properties, Events, Signals, Statistics and other information of the call tracing extended package can be further enriched, so that the tracing method could be enhanced and enriched. If no such a call tracing extended package is defined, the call trace function can not be properly realized. It should be noted in particular that the start and end of a call trace can be controlled via signals instead of setting the on-off tracing indicator in the transaction head of the H.248 message as mentioned in claim 2 of this invention while a similar effect of call trace can be obtained. However, according to this method of control a call trace via signals, the MG has to analyze to a deeper layer of the H.248 message, thus the efficiency of the call trace is relatively low.

It should be noted in addition, because of the limitations of the H.248 protocol, not all the commands can carry an extended package (herein, the extended package refers to a common extended package, not the specific call tracing extended package defined in the present invention). In the process of tracing the H.248 message without a call tracing extended package, the following mechanisms can be adopted without affecting the call trace function.

1) As the initial commands of a call (including such commands as Add and Modify) can carry the call tracing extended package, the MG can associate such contents as the Trace ID, the User Info, and the Trace Depth in the received call tracing extended package with the Termination ID and Context ID related to the call, and make a record of the association.

2) In case that no extended package can be carried, the MG can look up all the related information of the call tracing extended package corresponding to the call being traced according to the termination ID and context ID related to the call information, so that the functions of the call trace will not be affected.

Although the present invention has been illustrated and described with reference to preferred embodiments, those skilled in the art understand that modifications in form and detail could be made to such embodiments without departure from the spirit and scope of the present invention as defined by the appended Claims.

The invention claimed is:

1. A method of call trace on a Next Generation Network (NGN) Media Gateway (MG), comprising:
   receiving, by the NGN MG, an H.248 message from a softswitch, wherein trace information is added to a transaction header of a transaction of the H.248 message, and the trace information specifies that the transaction needs to be traced;
   according to the trace information, determining, by the NGN MG, that the transaction needs to be traced;
   outputting, by the NGN MG, information regarding to a command request belonging to the transaction to a trace window;
   outputting, by the NGN MG, a result of an operation requested by the command request to the trace window; and
   outputting, by the NGN MG, information regarding to a response corresponding to the command request to the trace window.

2. The method according to claim 1, wherein a call tracing extended package is set in the H.248 message,
   the trace window is identified by a value of a property parameter in the call tracing extended package.

3. The method according to claim 1, wherein the tracing information is set in a transaction identity (ID) of the transaction of the H.248 message.

4. The method according to claim 3, wherein the highest bit of the transaction ID is set to 1.

* * * * *